United States Patent [19]

Swartz

[11] 4,003,555
[45] Jan. 18, 1977

[54] DRINK SHAKER

[76] Inventor: William M. Swartz, 1430 W. Wrightwood Ave., Chicago, Ill. 60614

[22] Filed: Nov. 6, 1975

[21] Appl. No.: 629,375

[52] U.S. Cl. ............................ 259/54; 220/1 E; 220/23; 259/72; 259/DIG. 23
[51] Int. Cl.² .................................. A47J 43/27
[58] Field of Search ............ 259/DIG. 23, 72, 12, 259/29, 54, 173; 220/1 E, 23; 215/DIG. 8; 206/219

[56] References Cited

UNITED STATES PATENTS

| | | | |
|---|---|---|---|
| 53,965 | 4/1866 | Fisler | 259/72 |
| 58,165 | 9/1866 | Drennan | 259/72 |
| 1,967,469 | 7/1934 | Dulany | 220/1 E |
| 2,160,328 | 5/1939 | Durham | 259/DIG. 23 |
| 2,433,248 | 12/1947 | Sweier | 259/DIG. 23 |

*Primary Examiner*—Philip R. Coe
*Attorney, Agent, or Firm*—Morris Spector

[57] ABSTRACT

A drink shaker for mixing solids, and particularly those that tend to lump, and liquids, to mix beverages. The shaker comprises first and second containers of tumbler configuration, and a basket member formed to have its side wall and floor of a foraminous character. The basket member is to receive the solids to be mixed into the liquids of the drink and the basket member is formed to rest within the first container on a ledge structure provided for that purpose. The basket member is also formed for friction fit reception and retention within the second container. The second container is formed for a plug fit liquid sealing securement application within the first container. The basket member is shaped to provide for movement of the liquids on shaking into the second container for application to the solids in the basket member from both sides of same. With the liquids to be mixed placed in the first container and the solids to be mixed placed in the basket member that is then rested in the first container, the second container is seated on the first container in liquid sealing relation thereto as well as in friction fit retention relation to the basket member. The basket is so constructed as to facilitate fragmentation and dispersion of the solids into the liquids, during the shaking operation. When the shaking is completed, separation of the containers effects removal of the basket member from the first container as a unit with the second container.

7 Claims, 5 Drawing Figures

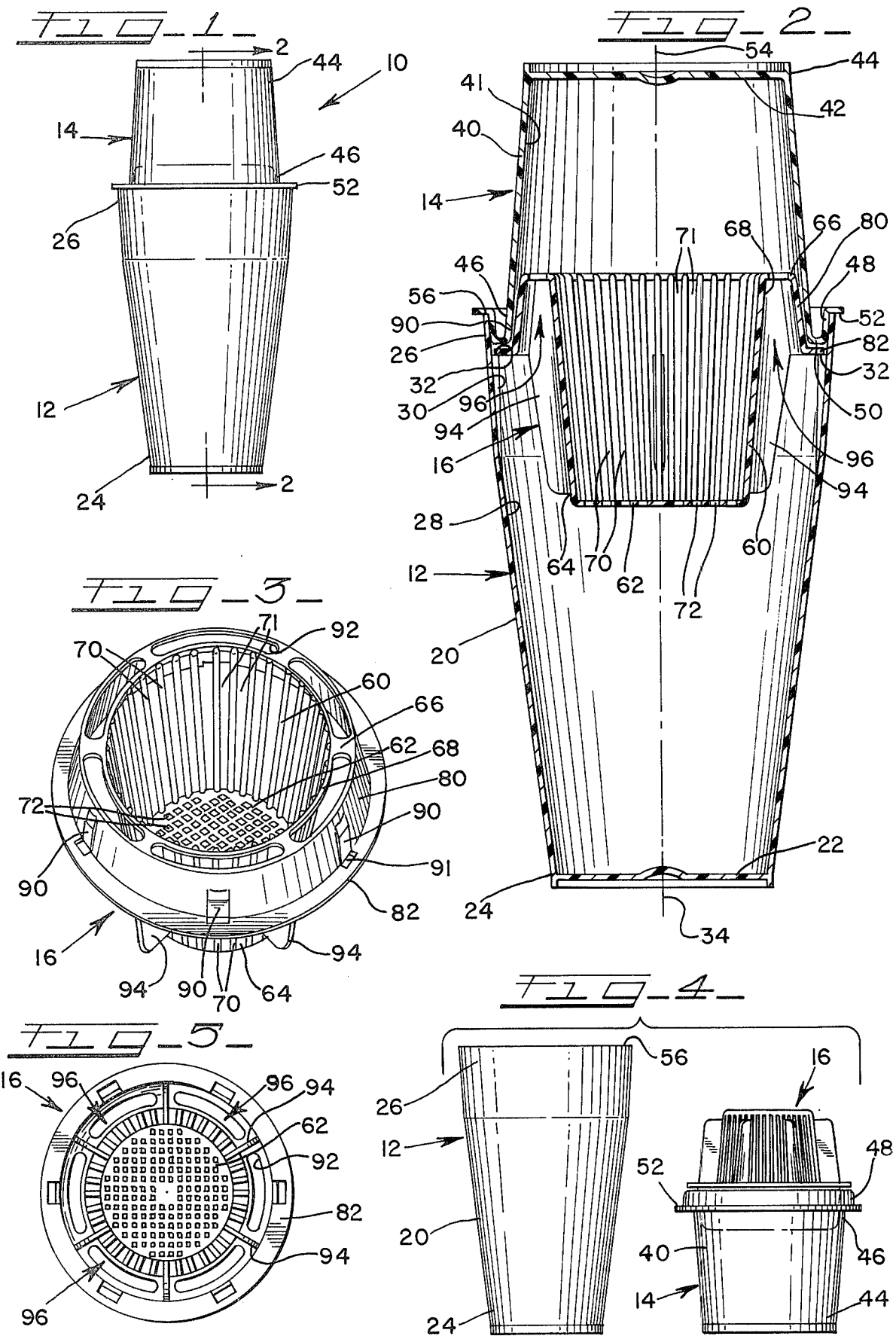

DRINK SHAKER

This invention relates to drink shakers, and more particularly, to shakers of the type employed to mix the solids and liquids of beverages that require thorough dispersion of the solid components into the liquid components thereof.

Drink shakers usually include at least one container that receives the liquids to be mixed and a cap or cover to close the shaker for shaking purposes, with the solids to be mixed usually being dropped directly into the liquids prior to shaking. It is well known that some powdered or particle type solids, such as cocoa or solid protein food particles when wetted, tend to lump and do not readily disperse into the liquids and it frequently happens that after shaking, undispersed solids remain in the form of floating lumps. To avoid this requires long shaking or straining.

A principal object of the invention is to provide a drink shaker which is arranged to effect maximum rapid break up of the solids on shaking and permits the pouring of the mixed beverage from the shaker free of any strainer while insuring that undissolved solids will be held separated from the beverage being served.

Another principal object of the invention is to provide a drink shaker in which the solids to be mixed are applied to a separate basket to be disposed within the shaker, with the shaker being constructed to provide for rapid break up and dispersion in the liquid of the lumping type solids.

Another principal object of the invention is to provide a drink shaker of the above character in which on removal of the shaker cover it carries the basket with it to leave the mixed beverage exposed in the open shaker that now may be freely poured for serving without requiring straining.

In accordance with the invention, a drink shaker is provided comprising a first or main container of tumbler configuration in which the liquids to be mixed are placed, and which is to contain the mixed beverage for free pouring therefrom on completion of the shaking operation, a second container of tumbler form that provides the cover for the first or main container, and between them a basket member that is to receive the solids to be mixed into the liquids by the shaking operation. The basket member is formed to rest within the main container, and is also formed for friction fit reception and retention within the second or cover providing container. The basket is also of tumbler configuration and is formed for a plug fit liquid sealing application within the open end of the main container. The basket member, which is foraminous in character, is shaped to accommodate movement of the liquids, on shaking, to the second or cover container for application to solids in the basket from both sides of same, to facilitate both break up of the solids and dispersion of the solids in the liquid.

With the liquids to be mixed placed in the main container and the solids to be mixed placed in the basket member, the latter is then rested in the main container, and the cover container is seated on the main container in liquid sealing relation thereto, which at the same time applies same in friction fit gripping relation to the basket member, whereby on shaking, the solids are exposed to and broken up by the liquids within the shaker, and when shaking is completed, separation of the containers effects removal of the basket from the main container as a unit with the cover container. The result is that the mixed beverage is exposed for free pouring from the main container and the cover container may be rested in an upright position that automatically disposes the basket for drainage flow therefrom that leaks into the cover container.

Other objects, uses, and advantages will be obvious or become apparent from a consideration of the following detailed description and the application drawings.

In the drawings:

FIG. 1 is a side elevational view of a preferred embodiment of the invention;

FIG. 2 is a vertical sectional view through the shaker of FIG. 1, on an enlarged scale;

FIG. 3 is a top or upper perspective view of the basket member of the shaker of this invention;

FIG. 4 is a view similar to that of FIG. 1, but showing the shaker separated for pouring a mixed beverage from the shaker; and FIG. 5 is a bottom plan view of the basket member.

However, it is to be understood that the specific drawing illustrations provided are supplied primarily to comply with the requirements of the Patent Laws, and that the invention is susceptible of other embodiments which will be obvious to those skilled in the art, and which are intended to be covered by the appended claims.

Reference numeral 10 generally indicates a shaker embodying this invention. It comprises a first or main container 12 of circular tumbler configuration, a second or cover container 14 of circular tumbler configuration, and a basket member 16 that is operably associated with both of the shaker containers and is adapted to receive the solid constituents of a beverage to be mixed by using the shaker 10. The solid materials may be powders, or small sized particulate material, such as for instance, powdered cocoa, instant solid protein food particles, or the like.

The main container 12, which receives the liquids to be mixed, is formed to define an encompassing or circumambient side wall 20, a lower circular wall 22 which closes off the end 24 of the container 12, with the circular end 26 of the container 12 being open to receive the basket member 16, and the cover container 14, as indicated in FIG. 2.

The container 12 on its inner surface 28 (see FIG. 2) is formed to define a plurality of stop ribs 30 (four in the illustrated embodiment spaced 90° apart), and each terminating in an upwardly directed supporting surface 32; the supporting surfaces 32 of the respective ribs 30 are in coplanar relation and lie in a plane that is perpendicular to the longitudinal axis 34 of the container 12.

The container 14 comprises encompassing or circumambient side wall 40, a circular bottom wall 42 that closes the end 44 of the container 14, with the container 14 being open at its end 46 to receive the basket member 16 in the manner indicated in FIG. 2.

The container 14 at its end 46 has an outwardly turned surrounding sleeve 48 that is concentric therewith and that is connected thereto by radially outwardly extending circular flange 50. The sleeve 48 terminates in laterally and outwardly directed flange 52 that lies in a plane at right angles to the longitudinal axis 54 of the container 14.

The sleeve 48 of container 14 is formed to fit into the open end 26 of the main container 12 in liquid sealing plug fitting relation thereto. For this purpose the sleeve 48 and the inner surface 28 of the container 12 have the complementary frusto-conical wedge fitting shapings that are indicated in FIG. 4, whereby when the cover container 14 is pressed into the open end 26 of the main container 12, the sleeve portion 48 will be in substantial liquid sealing relation with the end 26 of the main container 12 when the rim 56 of the container 12 is adjacent to or is engaged by the flange 52 of the cover container 14.

The basket member 16 comprises a side wall 60 of a foraminous structural arrangement extending between a foraminous bottom wall or panel 62 at the lower end 64 of the basket, and an outwardly directed flange 66 at the upper or open end 68 of the basket.

The basket side wall 60 comprises equally spaced bars 70 extending between the basket bottom panel portion 62 and the top flange portion 66 and defining between adjacent bars 70 elongated slots 71. Panel portion 62 is formed to define a plurality of spaced openings 72. The basket bars 70 are almost parallel to the longitudinal axis 54 of the shaker; in this instance they are at an angle which is a fractional part of 10 degrees. The bars 70 are of substantially uniform width in a direction circumferentially of the basket. As a result, the apertures 71 are wider at the top of the basket than at the bottom thereof. In one embodiment the apertures 71 are about 0.09 inch wide at the top and 0.07 inch wide at the bottom.

The basket 16 includes sleeve 80 connected thereto by flange 66 and that is concentric about the basket open end 68. The basket sleeve 80 terminates in a laterally and outwardly directed circular flange 82 that is transverse to the central axis of the basket member 16, and has an outside diameter proportioned for free reception of the basket into the open end 26 of main container 12 to rest on the rest surfaces 32 of the main container 12.

In accordance with the invention, the sleeve 80 of the basket is provided with a plurality (six in the form shown) of outwardly directed wedge surfaces 90 that are uniformly spaced from one another circumferentially around the exterior of sleeve 80, and are proportioned such that when the basket sleeve 80 is received within the open end 46 of the cover container 14, it is frictionally retained therein in jam fitting relation thereto, when the basket 16 is disposed within the cover container 14 such that its flange 82 is adjacent the flange portion 50 of the cover container 14.

The basket flange 66 is provided with a plurality of uniformly spaced elongate apertures or openings 92 (six in the illustrated embodiment, see FIG. 3). The basket 16 also includes a corresponding number of uniformly spaced apart strengthening webs 94 that connect the basket sleeve 80, flange 66, and a bar 70 of the basket side wall 60, as indicated in FIG. 5. The webs 94 also subdivide the exterior of the basket 16 into liquid flow directing channels 96 that are aligned with the marginal openings 92 of the basket member. As indicated in FIG. 2, the channels 96 are directed toward the frusto-conically contoured inside surface 41 of the cover container 14 for facilitating the action of the liquid constituents of the beverage to be mixed on the solid constituents thereof, during shaking. The basket flange 82 is formed to define a drain opening 91 at the base of each wedge surface 90.

The containers 12 and 14 and the basket member 15 preferably are formed from suitable plastic materials adapted for economical injection molding procedures such as polypropylene. Should it be desired that the material from which one of the containers such as the cover is formed to be transparent, clear styrene or an acrylic nitrile compound may be employed. Of course, transparency is an optional feature of the invention.

In use, assuming that the shaker 10 is to be used to mix a beverage having solid and liquid constituents, the liquid materials are poured into the container 12 through its open end 26. The basket 16 is applied to the container 12 (as shown in FIG. 2) either before or after the liquids are poured into container 12. The solid constituents, which ordinarily comprise solids in powdered or small particle form are placed in or poured into the basket member 16. The cover container 14 is then inverted and applied to the upper end 26 of the container 12 and to the sleeve 80 of the basket 16, and specifically its wedge surfaces 90, with the cover container 14 being hand pressed into the end 26 of the container 12 to simultaneously form a liquid tight seal between the sleeve 48 of the container 14 and the top portion of the inner surface 28 of the container 12 at its end 26, and place the basket member 16, and specifically its wedge nibs 90, in frictionally wedged gripping relation with the container 14. In the assembled shaker, longitudinally extending axes of the containers 12 and 14 and the basket member 16 coincide.

The assembled shaker is then grasped and shaken. The shaker may be grasped in one hand, with the thumb and the little finger or ring finger (or both) embracing the container 12 while the forefinger reaches over the end 44 of the container 14, and the index finger bears against the side wall 40 of container 14.

The shaker is shaken in the usual manner to throw the liquid contents of same longitudinally of the shaker. In so doing, the liquid when moving from the end 24 of the container 12 is directed against the underside of the basket member 16 and through same for application to one side of the solid materials in the basket. Meanwhile, a portion of the liquid materials moves through the slots 96 about the basket member 16, and the openings 92 of the basket member, for entry into the cover container 14 and impingement against the inside surface of the container wall 14 wherein the liquids are deflected towards the center of the container 14 so that on reversal of movement of the shaker, such liquids in moving in the opposite direction are applied against the upper side of the solid materials in the basket member 16 to aid in the break up of the solid members by forcing same through the apertures 72 and between the bars 70 as well as extensive physical contact with the solid materials involved. If the solid materials within the basket 16 are of the type that tend to lump when wetted by the liquid, the lumps will be carried by the agitated liquid in the basket and as that liquid flows out of the basket through the tapered longitudinal slots 71, the bars 70 act as strainers for the larger lumps. The swishing liquid will cause those lumps to slide along the edges of the bars 70, thus accelerating the wearing away or breaking up of the lumps. Furthermore, the manual shaking of the shaker causes a back and forth movement of the liquid through the slots 71. The direction of movement of the liquid is, to a large measure, parallel to the longitudinal axis of shaker. Liquid that impinges on the bars 70 will move along the slots and to a large measure will pass through the slots 71. To the extent that this liquid carries some lumps that can pass through the slots 71 those lumps will be reduced in size by impacts with and by sliding on the bars. Thus, the fragmentation or breaking up of lumps or solid particles is enhanced.

As shaking in this manner continues, the liquids move between the containers 12 and 14 in the manner indicated to envelop and break up the solid materials for effective dispersion of same in the liquids to finalize the beverage being made up.

Liquid that should get between the basket sleeve 80 and the cover container end 46 returns to container 12 through openings 91.

When the shaking is completed, the operator grasps the exterior of the container 14 and removes same from the container 12. Since the container 14 has been friction wedged into gripping relation with the basket member 16, the basket member 16 is also removed from the container 12 by the same action. The container 14 may be rested on its closed end 44, as illustrated in FIG. 4. Drippage from the basket 16 will then be caught by the cover container 14.

The open end 26 of the container 12 then fully exposes the mixed beverage, which now may be freely poured into serving glasses or the like for immediate serving of the liquid without any straining of the freshly mixed beverage being required.

It will thus be seen that the invention provides a shaker of three simplified components that not only provide for improved dispersion of the solid constituents of a beverage in the final mixture, but also avoids having to strain the beverage as it is being poured from the shaker. Furthermore, any concentrations of the solid material adhering to the basket member and liquid dripping from same will drop directly into the cover container by disposing the cover container in its upright position. For this purpose, the basket member is releasably connected to the cover container to remove same from the main container with the cover container, as a unit, when the shaker is open to pour the beverage.

The foregoing description and the drawings are given merely to explain and illustrate the invention and the invention is not to be limited thereto, except insofar as the appended claims are so limited, since those skilled in the art who have the disclosure before them will be ableing from the scope of the invention.

I claim:

1. A drink shaker comprising:
a first cupped container,
a second cupped container,
said containers each defining a circumambient side closed at one end of same and open at the other end of same,
a basket member defining a circumambient side wall having one end of same open and the other end of same closed by a foraminous panel portion,
means for supporting said basket member in said first container with the basket member other end directed toward the first container closed end,
said basket member open end being formed for plug fit entry into and securement to said second container open end,
and said open ends of said containers being formed for liquid sealing plug type slip fit and frictional securement of one of said container open ends within the other container open end,
said basket member side wall being foraminously formed for free passsage of liquid therethrough,
whereby liquids and solids to be mixed may be applied to the shaker by disposing the liquids in the first container and the solids in the basket member, with the basket member disposed in the first container on said support means, and said second container secured to said first container, and on shaking the shaker longitudinally thereof, the liquid passes through the basket panel portion and side wall to admix with the solids in the basket member from both sides of the basket member,
said support means comprising:
spaced ledges formed about the first container side wall on the inside surfacing thereof on which said basket member may rest when applied to said first container.

2. A drink shaker comprising:
a first cupped container,
a second cupped container,
said containers each defining a circumambient side closed at one end of same and open at the other end of same,
a basket member defining a circumambient side wall having one end of same open and the other end of same closed by a foraminous panel portion,
means for supporting said basket member in said first container with the basket member other end directed toward the first container closed end,
said basket member open end being formed for plug fit entry into and securement to said second container open end,
and said open ends of said containers being formed for liquid sealing plug type slip fit frictional securement of one of said container open ends within the other container open end,
said basket member side wall being foraminously formed for free passage of liquid therethrough,
whereby liquids and solids to be mixed may be applied to the shaker by disposing the liquids in the first container and the solids in the basket member, with the basket member disposed in the first container on said support means, and said second container secured to said first container, and on shaking the shaker longitudinally thereof, the liquid passes through the basket panel portion and side wall to admix with the solids in the basket member from both sides of the basket member,
said basket member including a sleeve portion disposed about its open end and formed to define wedging surface means for plug fit engagement with and within said second container open end,
said basket member being formed to define openings between the basket member side wall and said sleeve portion thereof for accommodating movement of liquid from the first container to the second container, on shaking of the shaker about the solids in the basket, between the basket member side wall and the basket member sleeve portion.

3. The shaker set forth in claim 2 wherein:
said basket member side wall is defined by spaced bars extending lengthwise of the basket member side wall,
said basket member including spaced radial flanges interposed between the basket member sleeve portion and the basket member side wall and integral therewith,
said flanges defining liquid movement guide slots disposed about the basket member side wall for movement of liquids on the shaker being shaken between the first to the second container, said side wall of the second container being tapered in the direction of the closed end thereof to deflect liquids passing into the second container, through said slots, on the shaker being shaken, toward the mid portion of the second container for return to the first container, on continued shaking of the shaker, through the solids in the basket member.

4. A drink shaker comprising:

a first cupped container, a second cupped container, said containers each defining a circumambient side closed at one end of same and open at the other end of same, a basket member defining a circumambient side wall having one end of same open and the other end of same closed by a foraminous panel portion, means for supporting said basket member within and on said first container in a predetermined operative position therein with the basket member other end directed toward said first container closed end, said basket member being formed to be freely receivable within said first container to its said operative position, said basket member open end being formed for removable plug type slip fit entry into and frictional securement to said second container open end, and said open ends of said containers being formed for removable liquid sealing plug type slip fit and frictional securement of one of said container open ends within the other container open end, said basket member side wall being foraminously formed for free passage of liquid therethrough, whereby liquids and solids to be mixed may be applied to the shaker by disposing the liquids in said first container and the solids in the basket member, with the basket member being disposed in said operative position thereof in the first container on said support means with said basket member other end directed toward said first container closed end, and said second container being pressed into said frictional securement with said first container and said basket member, and on shaking the shaker longitudinally thereof, the liquid passes through the basket panel portion and side wall to admix with the solids in the basket member from both sides of said basket member, and whereby on separation of said second container from said first container, said basket member remains with said second container to free said first container open end of said basket member, and when said second container is disposed in an upright position, drippings from said basket member drain into said second container.

5. The shaker set forth in claim 4 wherein said support means comprises:

spaced ledges formed about said first container side wall on the inside surfacing thereof on which said basket member may rest when applied to said first container in said operative position thereof.

6. The shaker set forth in claim 4 wherein:

said basket member includes a sleeve portion disposed about its open end and formed to define wedging surface means for said plug type slip fit engagement with and within said second container open end, said basket member being formed to define openings between said basket member side wall and said sleeve portion thereof for accommodating movement of liquid from said first container to said second container, on shaking of the shaker, about the solids in the basket, between said basket member side wall and said basket member sleeve portion.

7. The shaker set forth in claim 4 wherein:

said second container is formed from transparent material.

* * * * *